(12) United States Patent
Koo et al.

(10) Patent No.: US 7,162,541 B2
(45) Date of Patent: Jan. 9, 2007

(54) APPARATUS AND METHOD FOR PROVIDING DATA SERVICE IN A WIRELESS SYSTEM

(75) Inventors: Chang-Hoi Koo, Songnam-shi (KR); Dong-Seek Park, Suwon-shi (KR); Dae-Gyun Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 697 days.

(21) Appl. No.: 10/073,458

(22) Filed: Feb. 11, 2002

(65) Prior Publication Data

US 2002/0118698 A1 Aug. 29, 2002

(30) Foreign Application Priority Data

Feb. 9, 2001 (KR) ................................. 2001-6535

(51) Int. Cl.
G06F 15/16 (2006.01)
H03M 13/00 (2006.01)
H03M 13/03 (2006.01)

(52) U.S. Cl. ........................ 709/245; 714/774; 714/790

(58) Field of Classification Search ................ 709/245, 709/246; 370/342, 441, 355, 341, 479, 480; 714/6
See application file for complete search history.

(56) References Cited

U.S. PATENT DOCUMENTS

| | | | | |
|---|---|---|---|---|
| 5,674,003 A | * | 10/1997 | Andersen et al. | ........... 709/228 |
| 5,793,744 A | * | 8/1998 | Kanerva et al. | ............ 370/209 |
| 6,501,748 B1 | * | 12/2002 | Belaiche | ..................... 370/342 |
| 6,690,734 B1 | * | 2/2004 | Lundby et al. | ............. 375/259 |
| 6,775,254 B1 | * | 8/2004 | Willenegger et al. | ....... 370/329 |
| 6,781,971 B1 | * | 8/2004 | Davis et al. | ................ 370/329 |
| 6,788,657 B1 | * | 9/2004 | Freiberg et al. | ............. 370/328 |
| 2003/0133497 A1 | * | 7/2003 | Kinjo et al. | ................ 375/152 |
| 2004/0146029 A1 | * | 7/2004 | Tong et al. | .................. 370/335 |
| 2004/0240401 A1 | * | 12/2004 | Willenegger et al. | ....... 370/294 |

* cited by examiner

Primary Examiner—John Follansbee
Assistant Examiner—Ashok Patel
(74) Attorney, Agent, or Firm—The Farrell Law Firm (57) ABSTRACT

A system architecture for ensuring QoS levels to different inter-media streams or media streams of an intra-media stream. In such a system, an RLP layer classifies transmission data streams by priority level and separates each transmission data stream into data streams of predetermined lengths according to characteristics of the data streams. A MUX layer segments the separated data streams according to a data rate. A plurality of MQC channels encode the segmented data at a predetermined code rate, repeat code symbol sequences with higher priority levels, and puncture code symbol sequences with lower priority levels. A serial concatenator serially concatenates the repeated and punctured code symbol sequences.

10 Claims, 4 Drawing Sheets

APPARATUS AND METHOD FOR PROVIDING DATA SERVICE IN A WIRELESS SYSTEM

PRIORITY

This application claims priority to an application entitled "Apparatus and Method for Providing Data Service in a Wireless System" filed in the Korean Industrial Property Office on Feb. 9, 2001 and assigned Serial No. 2001-6535, the contents of which are hereby incorporated by reference.

BACKGROUND OF THE INVENTION

1. Field of the Invention

The present invention relates generally to a protocol structure for a CDMA (Code Division Multiple Access) communication system, and in particular, to an apparatus and method for ensuring multimedia service and high rate data transmission in a mobile communication system.

2. Description of the Related Art

In general, a mobile communication system should provide a high throughput when transmitting data at high data rate. In the radio protocol of the mobile communication system, the function blocks of an RLP (Radio Link Protocol) layer, a MUX (Multiplex) layer, and a physical layer are very significant in determining performance. Interfacing and information flow between layers are also important in order to achieve a high throughput during a high rate data transmission.

Existing mobile communication systems, particularly IS-2000, HDR (High Data Rate) proposed with the technology of the 1XEV of the 3GPP2, and the 1XTREME do not ensure a high throughput when providing a high rate data service because they are not configured suitably for multimedia service, let alone for optimization of throughput in a packet data service.

With regard to HDR, a physical channel transmits only data with the same QoS (Quality of Service) level. Although it transmits/receives multiple data, the HDR system supports only non-real time service. A physical layer, scheduling, and signaling are designed in the HDR system to support high rate non-real time data service to users within a cell. Another problem with the HDR system is that QoS control cannot be carried out according to different priority levels of multiple input data and different priority levels within an input data. When an Internet data service, a voice service, and a multimedia service are provided contemporaneously to a user, the services have different priority levels. The voice service must be provided in real time, and the multimedia service, and the Internet data service may be provided in real time or non-real time. Due to the QoS control limitation, the HDR system cannot ensure different QoS levels to intra-media data and inter-media data. The other conventional systems exhibit the same shortcomings. That is, the conventional mobile communication systems cannot offer different QoS levels to intra-media data or inter-media data and as a result, cannot provide multimedia service.

SUMMARY OF THE INVENTION

It is, therefore, an object of the present invention to provide an apparatus for implementing a protocol structure that enables efficient data service and provides multimedia service and a control method thereof in a wireless system.

It is another object of the present invention to provide an apparatus for enabling high rate data transmission and offering high throughput during data transmission and a control method thereof in a wireless system.

The foregoing and other objects are achieved by providing a system architecture for ensuring QoS levels to different inter-media streams or the media streams of an intra-media stream. In such a system, an RLP (Radio Link Protocol) layer classifies transmission data streams by priority level and separates each transmission data stream into data streams of predetermined lengths according to the characteristics of the data streams. A MUX layer segments the separated data streams according to a data rate. A plurality of MQC (Multiple Quality Control) channels encode the segmented data at a predetermined code rate, repeat code symbol sequences with higher priority levels, and puncture code symbol sequences with lower priority levels. Here, the number of repeated symbols is equal to that of punctured symbols. A serial concatenator serially concatenates the repeated and punctured code symbol sequences.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
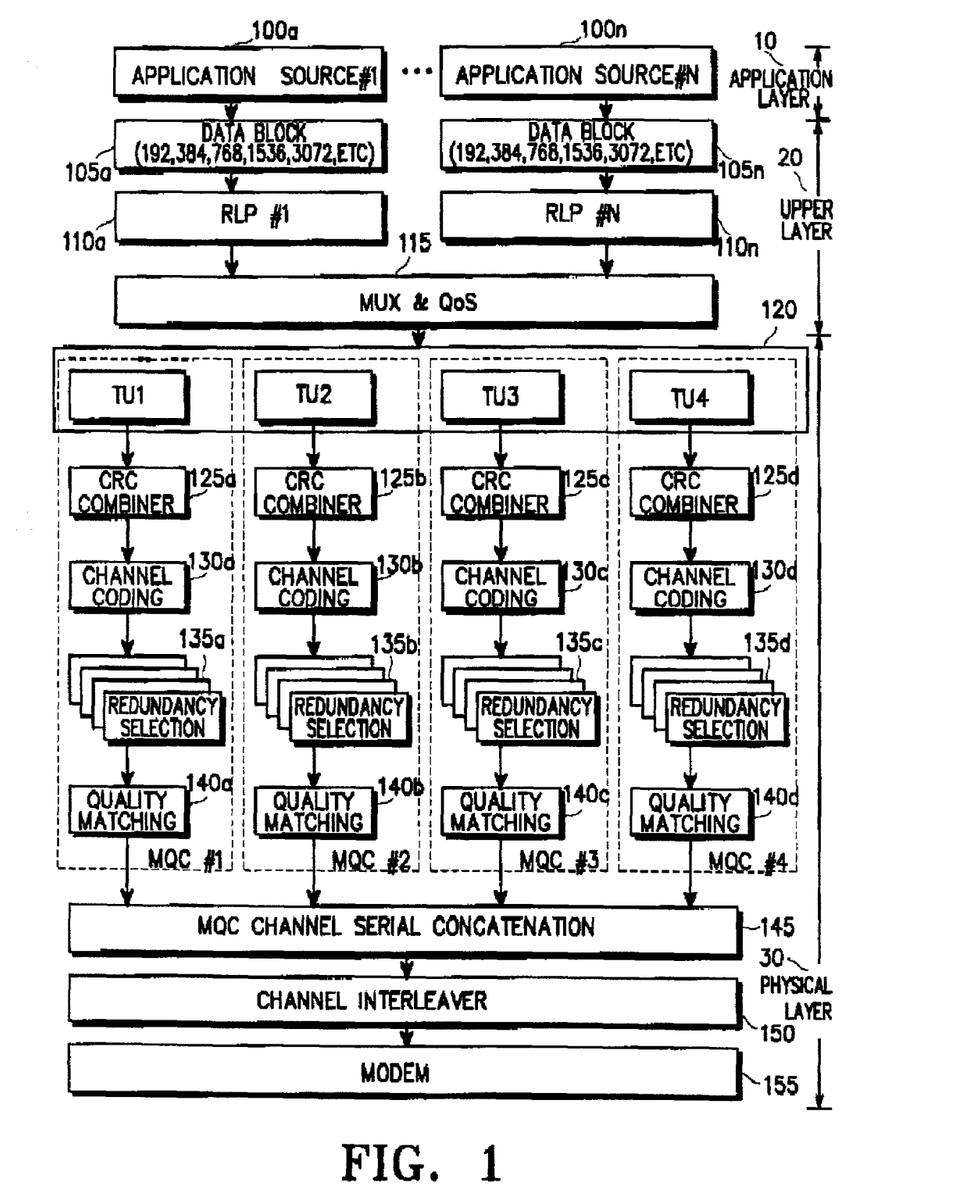
FIG. 1 is a block diagram illustrating a protocol structure for data processing in a system according to the present invention.

FIG. 1 is a block diagram of protocol layers for data processing in a system according to the present invention. The structure and operation of each protocol layer block will be described below with reference to FIG. 1.

Referring to FIG. 1, an application layer 10, an upper layer 20, and a physical layer 30 are defined in the system according to the present invention. This protocol structure represents a general user plane for transmission of pure user information, i.e., no control information is transmitted. From a control plane's perspective, logical channels proposed according to the present invention are mapped to specific control channels and MQC (Multiple Quality Control) channels are mapped on a 1:1 basis to logical channels. The description of the present invention will be confined to the user plane, while each function block is still applicable to the control plane.

The application layer 10 is shown having at least two application sources 100a and 100n. Multiple streams are generated in the application layer 10 as a data service is provided during a voice service, or a video service is provided during a data service. On the other hand, if one application source stream is generated but it includes two data streams with different characteristics such as a packet voice service, video conferencing, and video streaming, the application source stream is separated into the two media streams according to their characteristics. Independent streams generated from multiple application sources are called inter-media streams and a stream with different characteristics from one application source is called an intra-media stream.

Data streams from the application source #1 100 to application source #N 100n are packed to data blocks 105a to 105n. The data blocks may be 192, 384, 768, 1536, 2048 or 3072 bits long. The size of each data block varies with the data rate of its application source. In the case of a video service having a variable bit rate, a data block size is chosen according to the variable bit rate. For an Acknowledgement (Ack) signal of about 320 bits in TCP/IP as another example, a data block size is chosen according to the signal length.

RLP portions 110a to 100n segment the data blocks of different sizes according to a data rate determined in the physical layer. If an input data block is 1536 bits long and the length of a transport unit (TU) in the physical layer is 768 bits, the 1536-bit data block is segmented into two 768-bit data blocks.

As illustrated in FIG. 1, the number of RLP portions 110a to 100n is equal to the number of the application source streams. However, a single RLP portion can take charge of multiple application source streams. For better understanding of the present invention, the number of RLP portions 110a to 110n is set to be equal to that of the application source streams in FIG. 1. Hence, the size of a segmented data block in each RLP portion depends on the characteristics of its application source data stream and the data rate.

The RLP portions 110a to 100n manage the sequence numbers of data transmitted on logical channels and carry out data segmentation. If a single RLP portion manages a plurality of logical channels, it does so not individually, but collectively. The length of segmented data is less than or equal to TU length for an MQC that is a physical layer sub-channel.

A MUX & QoS (hereinafter, referred to as MUX) 115 functions to map logical channels to MQCs. The logical channel-MQC mapping is performed as follows.

(1) Multiplexing Functionality.

If data received on a logical channel is shorter than a TU length set for an MQC, the data is assembled with data received on another logical channel to build a data unit of a fixed length.

(2) Switching Functionality.

If data received on a logical channel is as long as the TU length for the MQC, the data is mapped without assembly with another logical channel data to a particular MQC. Another function of the switching is to map the data of logical channels with the same or similar QoS levels to an MQC with a particular QoS, or distribute the data received on the logical channels appropriately to MQCs in order to always activate the MQCs.

(3) QoS Control Functionality.

Data received on a logical channel is mapped to an MQC according to its priority level, which can be determined according to the characteristics of the logical channel. If control information is transmitted along with data information, or signaling information containing system information is transmitted with other data information, the control information and signaling information are given a higher priority level.

TUs 120 are data blocks output from the MUX 115 after processing according to the above functionalities of the MUX 115 and transmitted on MQC channels. N MQC channels can be defined according to the number of data blocks output from the MUX 115, but four MQC channels are illustrated in FIG. 1, by way of example. If only one MQC channel exists, this implies that the system of the present invention operates in a similar manner to the conventional mobile communication systems.

TU length can be determined in two ways. First, available TU lengths are set preliminarily and then a specific TU length is selected. Second, a TU length range is set and a TU length is set on a bit basis or a byte basis within the range. The two methods can be applied to the protocol structure illustrated in FIG. 1. Therefore, the protocol structure according to the present invention is semi-dynamic enough to appropriately reflect channel environment and the characteristics of application services.

The MQC channels (four MQC channels here) are the same in structure and thus the following description is made of only MQC #1.

Since the TUs 120 are raw data before processing, CRCs (Cyclic Redundancy Check/Codes) must be added to the TUs 120 for error correction. CRC combiners 125a to 125d add CRCs to the four TUs 120 so that a receiver can perform an error check using CRC and request retransmission of the data with errors. The length of a CRC is different according to the length of a TU. Information about CRC length must be exchanged beforehand between the transmitter and the receiver so that the receiver can determine a CRC length for each TU.

Channel encoders 130a to 130d perform channel encoding. Turbo encoders are used as the channel encoders 130a to 130d by way of example in the present invention. A different turbo code rate can be applied to each TU transmitted on an MQC, or the same code rate can be applied to all TUs on the MQC.

In HARQ (Hybrid ARQ), retransmitted data may have a different code rate from initially transmitted data. Determination of a code rate for retransmission will be described in more detail later.

Redundancy selectors 135a to 135d are useful for HARQ II/III as a link transmission scheme. The combining performance of a receiver can be improved by transmitting a different redundancy matrix, that is, a different complementary ode at retransmission (on a TU basis in the present invention).

Four redundancy selectors are assigned to each MQC channel in FIG. 1, though the number of the redundancy selectors per MQC channel is not limited to four. A redundancy selector is chosen appropriately at an initial transmission or retransmission according to a determined TU length and the current data rate. For example, if a TU generated from application source stream #1 has 768 bits (excluding CRC bits) and a TU generated from application source stream #2 has 1536 bits (excluding CRC bits), different repetition and puncturing patterns can be used for them. Even if TUs having the same length are transmitted at the same time, puncturing and repetition of the TUs can be carried out by choosing different redundancy selectors.

QoS matchers (QMs) 140a to 140d provide a different QoS to each TU. The total bit number of N data blocks are identical before and after processing in the QMs 140a to 140d. The QMs 140a to 140d re-adjust the lengths of input TUs at appropriate ratios through puncturing and repetition. A QM value can be assigned fixedly or dynamically when a channel is established. In the former case, a QM value is determined when channels are established between a base station and a mobile station for data transmission, while in the latter case, a QM value is transmitted on a control channel to a receiver at each TU transmission. QM values are relative parameter values by which different QoS levels are set for physical sub-channels according to application service characteristics.

An MQC channel serial concatenator (hereafter, referred to as a serial concatenator) 145 serially concatenates the QoS-matched TUs transmitted on the MQC channels. The serial concatenator 145 functions to construct a physical layer packet (PLP) by matching the input TUs to an interleaver size. The input of a channel interleaver 150 (i.e., the output of the MQC channel serial concatenator 145) can be adjusted to have a fixed size or a variable size. The interleaver input size may vary with the length of each TU output from the MUX 115. If the sum of TU lengths exceeds a maximum interleaver size, the QMs 140a to 140d control the lengths of TUs. If the sum of the TU lengths is less than the maximum interleaver size, the TUs are repeated to match to the maximum interleaver size or are transmitted as they are. This will be described later in detail with reference to FIG. 3.

The channel interleaver 150 performs symbol pruning on the serially concatenated TUs in addition to interleaving. The interleaved data is modulated and then transmitted on a physical channel in a MODEM 155.

Figure 2:
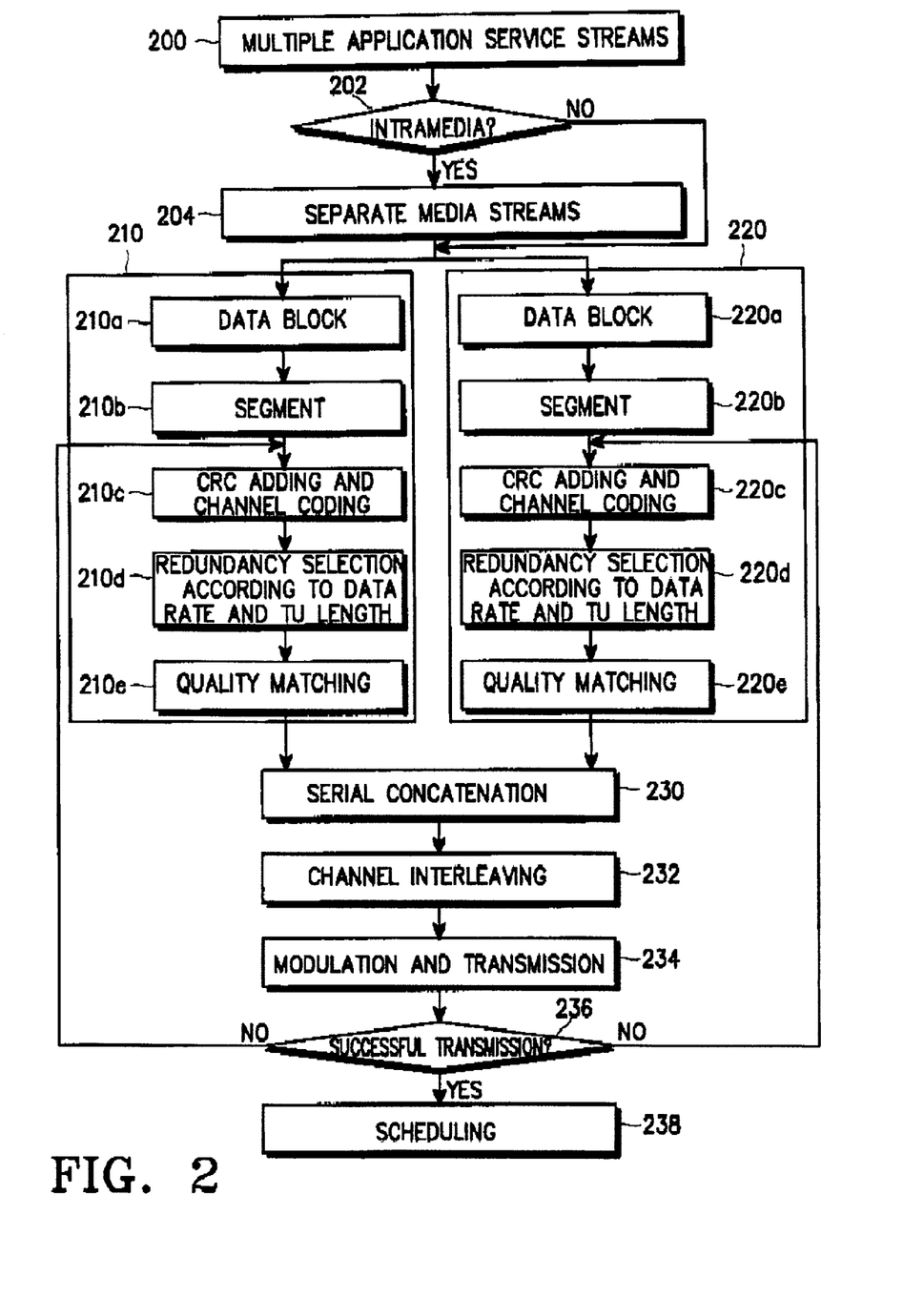
FIG. 2 is a flowchart illustrating a procedure for transmitting application service data on MQC (Multiple Quality Control) channels according to a preferred embodiment of the present invention.

FIG. 2 is a flowchart illustrating a procedure for transmitting application service data according to a preferred embodiment of the present invention. The protocol structure is applicable to both a base station and a mobile station and the following description is made on the assumption that a transmitter performs the procedure of FIG. 2.

Application service data transmission will be considered in two cases in this one embodiment: two inter-media streams on two MQC channels and one intra-media stream with two different characteristics on two MQC channels.

Upon input of application service data in multiple streams in step 200, it is determined whether the application service data is intra-media data in step 202. Here, it is assumed that the application service data has media data requesting different QoS levels. In the case of intra-media data, the procedure goes to step 204 and in the case of inter-media data, it goes to step 210 or 220. In the latter case, each media stream is transmitted on one MQC channel, which will not be described in detail.

In step 204, the intra-media data is divided into two different media streams requesting different QM values in order to implement an MQC scheme characterized by TUs of a variable length and different redundancy selections according to QoS levels.

Subsequently, the separated media streams should be packed in data blocks. In the case of a video service having a variable bit rate, data blocks can be constructed in a wide length range. A system must be so configured as to appropriately transmit data blocks of different lengths. While the system of the present invention meets this characteristic requirement, the following description is made of data in blocks of a predetermined length (bits) for better understanding.

In step 210a and 220a, the media streams are packed in data blocks of 192, 384, 768, 1536, or 3072 bits. The sizes of the data blocks can be adjusted to any other values, which is well known to those skilled in the art. In steps 210b and 220b, the data blocks are applied to the input of two of the RLP portions 100a to 110n illustrated in FIG. 1. Each RLP portion processes data blocks from one data stream. If a single RLP portions operates in FIG. 1, the RLP processes data blocks from both data streams. Each RLP portion re-segments or directly transmits the input data block according to the data rate determined in the physical layer. That is, segmentation or direct transmission is selected according to the data rate and the data size. If application source streams from which data blocks with different lengths arise are generated later, the resulting RLP segment frames are also different in length.

Data blocks that were processed in the RLP portions are TUs. The TUs may have different lengths according to the data rates of their source data and the characteristics of their application services (i.e. delay time). For example, a TU needs to be small for an application source requiring real time transmission because segmentation in small units reduces transmission errors to avoid retransmission. On the contrary, in the case of an application source stream to which retransmission is allowed or which is not sensitive to transmission time delay, it is preferable to transmit the data in TUs of a great length. The inventive TU structure of a variable length is adaptive to the characteristics of application source streams and avoids padding to match source-generated data blocks to data blocks of a particular length.

The QoS levels of the TUs having different lengths are compensated again in the QMs 140a to 140d illustrated in FIG. 1, which will be described later in more detail referring to FIG. 3. In addition, the structure of data blocks and the operation of the RLP portions will be described later with reference to FIG. 4.

In steps 210c and 220c, the TUs are subjected to CRC adding and channel coding by use of convolutional codes or turbo codes. In the system illustrated in FIG. 1, the TUs can be processed irrespective of code type.

In steps 210d and 220d, redundancy selection is performed. As stated before in connection with FIG. 1, a plurality of redundancy selectors may exist for each MQC channel. They are selectively used according to TU length and the present data rate. Redundancy selection is useful for HARQ II/III. In particular, different redundancy selection can be applied to a retransmitted TU from an initially transmitted TU. While four redundancy selectors are assigned to each MQC channel in FIG. 1, the number of the redundancy selectors per MQC channel is not limited to four.

In steps 210e and 220e, the lengths of the TUs are re-adjusted at an appropriate ratio. If two TUs each having 100 bits are input and QMs control the TUs to have 150 bits and 50 bits, respectively, the 150-bit TU becomes resistant to errors, and the 50-bit TU becomes vulnerable to errors. This QoS matching is carried out by puncturing and repetition. Unlike puncturing and repetition in steps 210d and 220d, the total length of the TUs is constant before and after the QoS matching, to thereby ensure the QoS levels of media streams transmitted in a real physical radio channel environment.

In step 230, the QoS-matched TUs are serially concatenated by the serial concatenator 145. The channel interleaver 150 interleaves the serially concatenated sequence in step 232, and the MODEM 155 modulates and transmits the interleaved sequence in step 234. In step 236, it is determined whether the transmission is successful in an HARQ method or any other method. If the transmission is successful, scheduling is set for new data transmission in step 238. On the other hand, if the transmission has failed, the procedure returns to steps 210c and 220c.

Since the system of FIG. 1 has four MQC channels, up to four TUs can be transmitted at the same time. Then, a receiver transmits responses for the four TUs to the transmitter. If two TUs transmitted on two MQC channels have errors, they are re-processed in step 230. This occurs when the transmitter receives Nack signals for the two defective TUs from the receiver. When different channel coding is used for TU retransmission, the retransmission procedure starts with step 210c. If the channel coding for initial transmission is still used for the TU retransmission, the retransmission procedure starts with step 210d. That is, different channel coding or the same channel coding can be applied for retransmission in step 210d.

If a retransmission is requested, the present data rate should be considered. Therefore, a puncturing and repetition pattern different than the initial transmission may be used in step 210d. Also in step 210e, QoS matching may be carried out in a different manner from the initial transmission.

If the TU retransmission is successful in step 236, which implies that Ack signals have been received for the transmitted TUs, scheduling for new data transmission is performed according to a transmission scheme in step 238.

Figure 3:
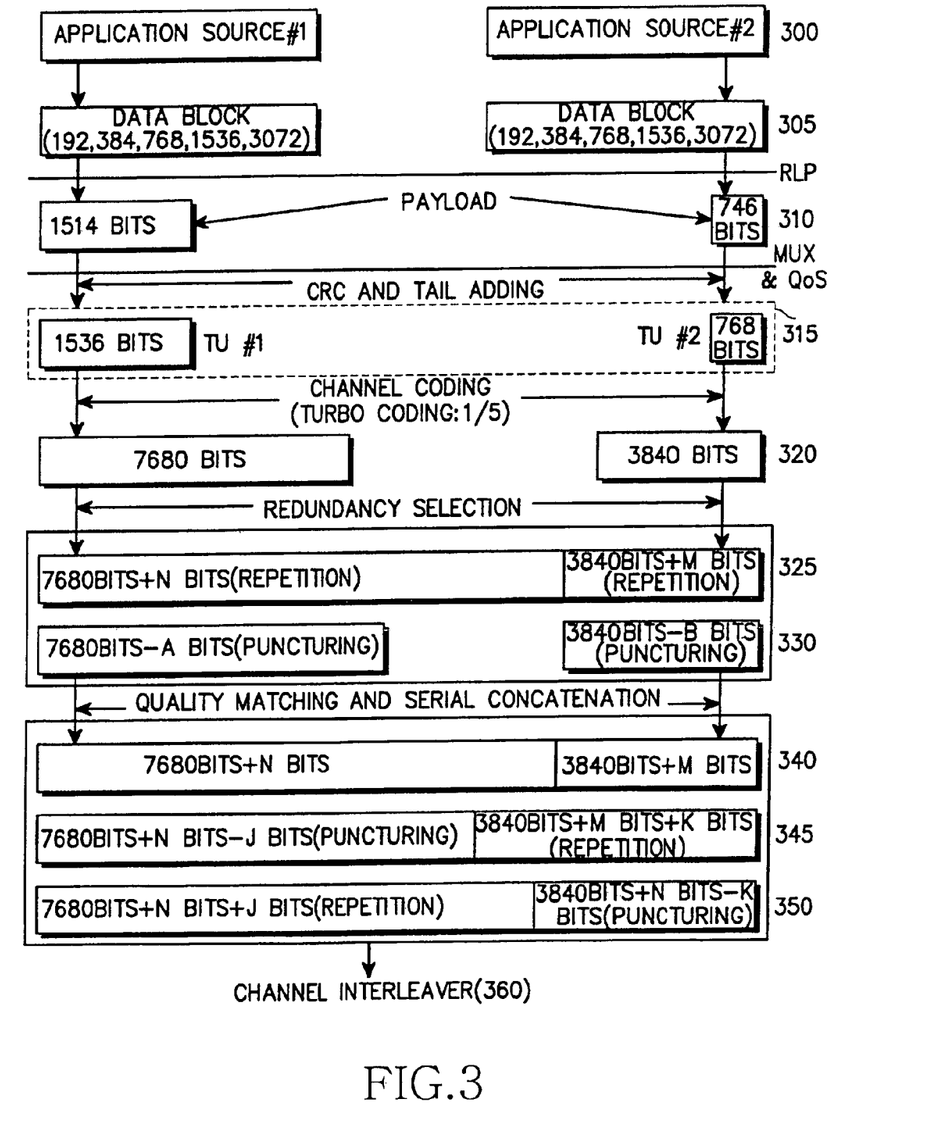
FIG. 3 is a functional block diagram illustrating the transmission of TUs with different lengths on two MQC channels.

FIG. 3 is a functional block diagram illustrating transmission of TUs having different lengths on two MQC channels with specific numerical citations. Some of the functional blocks illustrated in FIG. 1 are illustrated in the right size for the TU lengths in FIG. 3. Referring to FIGS. 1, 2 and 3, transmission of two application sources having different lengths according to the present invention will be described.

In step 300, two application source streams having different characteristics are input. A long data block is generated from application source #1 and a short data block is generated from application source #2. The application source streams are constructed into packets with different lengths in step 305. A packet can be formed on a bit basis or on a byte basis, but 192, 384, 768, 1536, and 3072 bits are given as available packet lengths in the present invention. If source data is less than 192 bits, it is constructed to a 192-bit data block. The data blocks defined in step 305 may have different lengths according to their application sources. In the RLP layer, the data blocks can be re-segmented. For example, a 384-bit data block can be segmented into 192-bit data blocks according to the data rate of a physical layer.

The lengths of the data blocks defined in step 305 include CRC and tail bits. The pure payloads of the segmented data blocks after processing in the RLP layer are given as 1514 bits and 746 bits, respectively, in step 310 and multiplexed in the MUX layer. A 16-bit CRC and 6 tail bits are added to each payload in the MUX layer. The numbers of CRC and tail bits can be different according to the length of an input payload or transmission characteristics. In the present invention, a CRC is 16 bits in length and 6 tails bits are used.

After multiplexing, the data blocks form TU #1 and TU #2. In step 315, the 1536-bit TU and the 768-bit TU are channel-encoded using convolutional codes or turbo codes. The embodiment of the present invention is described in the context of turbo codes having a code rate of ⅕.

After turbo coding with a code rate of ⅕, TU #1 and TU #2 have 7680 bits and 3840 bits, respectively in step 320. The TUs are subjected to redundancy selection in step 325 or 330. The redundancy selection is carried out according to the data rate provided by the physical layer, that is, a data rate determined by a DRQ (Data Rate Request) transmitted from a mobile station to a base station. A detailed description of DRQ will be avoided here because it is beyond the scope of the present invention.

Repetition and puncturing occur in step 325 and 330, respectively. If repetition is applied according to the determined data rate, TU #1 is repeated to have additional N bits and the TU #2 is repeated to have additional M bits. In the case of puncturing, A bits and B bits are punctured from the TUs of application sources #1 and #2, respectively. While not shown in steps 325 and 330, it can be contemplated that the TU of application source #1 is punctured and the TU of application source #2 is repeated, or vice versa.

In steps 340, 345, 350, TU #1 and TU #2 are QoS-matched and serially concatenated. The QMs control the bit numbers of the input TUs at an appropriate ratio. Before and after QoS matching, the sum of the bits of the TUs is the same. QoS matching is carried out by puncturing and repetition in a different manner for a different purpose from the puncturing and repetition of steps 325 and 330. After QoS matching, the number of bits to be serially concatenated is constant all the time because the serially concatenated data is input to the channel interleaver. However, the size of the interleaver 150 may be changed according to the bit number of the input TUs. In the present invention, it is assumed that the channel interleaver size is fixed as in step 330. The change of the interleaver size may occur in step 330 where the two TUs are punctured. If they are QoS-matched one to one, there are no bits to add or to eliminate. Thus, the channel interleaver size must be changed.

The one to one QM occurs in case of step 340. 7680 bits+N bits (TU #1) and 3840 bits+M bits (TU #2) of step 325 and 7680 bits−A bits (TU #1) and 3840 bits−B bits (TU #2) of step 330 are maintained intact in QoS matching. TU #1 is punctured and TU #2 is repeated for QoS matching in case of step 345. The number of punctured bits in TU #1 is equal to that of repeated bits in TU #2. Conversely, TU #1 is repeated and TU #2 is punctured in case of step 350.

In step 360, the channel interleaver 150 interleaves the serially concatenated stream to reduce burst errors during radio transmission and transmits the data in transmission slots of a physical channel after modulation. The above QoS matching is performed to reduce an error rate when data requesting different QoS levels according to their application sources should be transmitted wirelessly.

Figure 4:
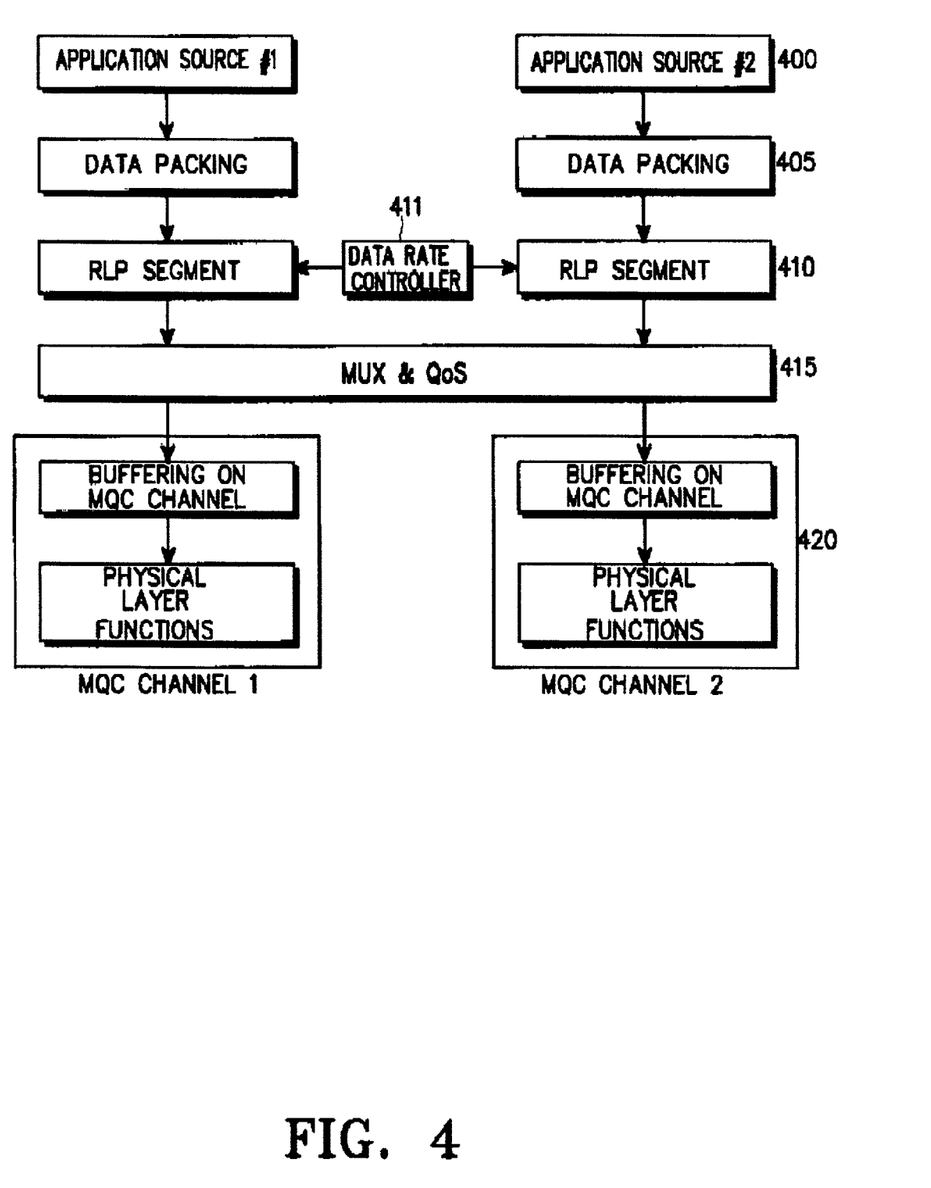
FIG. 4 is a flowchart illustrating a procedure for transmitting application service data on MQC channels according to another preferred embodiment of the present invention.

FIG. 4 is a flowchart illustrating data transmission on MQC channels according to another embodiment of the present invention. In step 400, inter-media streams are generated from multiple application sources or an intra-media stream is generated from one application source. Two streams with different characteristics will be taken as an example in the present invention irrespective of inter-media or intra-media.

According to the characteristics of application sources, data generated in step 400 may have different lengths. For example, data blocks having a variety of data rates can be generated from a VBR (Variable Bit Rate) video service. Data such as a TCP Ack/Nack signal has about 320 bits. Therefore, data generated from application sources have a variable length and the length of a data block may vary on a bit basis or on a byte basis according to source characteristics. In general, data needs to be packed on a predetermined bit basis for reliable transmission in a mobile communication system.

In step 405, data generated in step 400 is packed in data blocks of predetermined lengths, for example, 192, 384, 768, 1536 or 3072 bits. If the generated data has 190 bits, it is packed to a 192-bit data block. If the data has more than 3072 bits, it is segmented into 3072-bit data blocks. Therefore, data blocks of lengths among the above five lengths are stored in buffers in step 405. If 250-bit data is generated, it is packed to a 384-bit data block or two 192-bit data blocks.

In step 410, the data rate of a physical channel is controlled. An appropriate TU length must be selected according to the data rate. As a matter of fact, the TU length is the length of data transmittable in a time slot. The data rate is determined based on a carrier-to-interference (C/I) transmitted from a mobile station to a base station. That is, the mobile station reports a data rate available for data reception to the base station and then the base station transmits data according to the data rate. A data rate controller 411 serves to determine the data rate and reports it to the RLP layer. The determined data rate is the present available data rate.

In step 415, the data blocks are segmented or bypassed based on the data rate. If a data block is too long for the data rate, the data block is segmented. For example, if a transmittable data block length is 768 bits and a data block from an application source is 1536 bits, the RLP layer segments the 1536-bit data block and transmits two 768-bit data blocks. On the other hand, if data blocks from two application sources are 768 bits long and the length of a data block transmittable at the present data rate is 1536 bits, the two data blocks are transmitted without segmentation. RLP portions (not shown) segment the data blocks to appropriate sizes according to the data rate. That is, the RLP portions construct TUs of a variable length or transmit the data blocks generated in the upper layer without segmentation. The RLP portions transmit the data blocks from the application sources within a range of the sum of data block lengths determined by the data rate. As described above, the data blocks transmitted at the same time may differ in length. Accordingly, TUs having different lengths are generated from data blocks from different sources.

Also in step 415, the data blocks are switched to corresponding MQCs in the MUX 115. Step 420 is performed on the MQC channels as described with reference to FIG. 1.

To implement the system having a variable length-MQC structure of the present invention, a base station must transmit particular information to the mobile station. Ten bits are needed to deliver the information: 2 bits to represent four MQC channels, 5 bits to represent a QMI (Quality Matching Indicator) for QM, and 3 bits to notify the length of a TU transmitted on each channel. The information may be multiplexed in the preamble of forward transmission data, or can be transmitted on a control channel to the mobile station. The transmission method of the information will not be described herein.

As described above, the protocol structure of the present invention provides efficient data service and multimedia service. Furthermore, high rate data transmission is ensured and a high throughput can be achieved during data transmission.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of simultaneously transmitting data having the same or different priority levels to a mobile station in a mobile communication system, comprising the steps of:

classifying transmission data streams by priority level and separating each transmission data stream into data streams of predetermined lengths according to characteristics of the data streams;

segmenting the separated data streams according to a data rate;

encoding the segmented data on a plurality of multiple quality control (MQC) channels at a predetermined code rate, repeating code symbol sequences with higher priority levels, and puncturing code symbol sequences with lower priority levels, the number of repeated code symbols being equal to the number of punctured code symbols; and serially concatenating the repeated and punctured code symbol sequences, wherein each of the MQC channels comprises:

a channel encoder for encoding the segmented data at the predetermined code rate; and a quality matcher (QM) for repeating the code symbol sequences with the higher priority levels and puncturing the code symbol sequences with the lower priority levels.

2. The method of claim 1, wherein if the transmission data stream is an intra-media stream, the transmission data stream is separated into at least two data streams by priority level.

3. The method of claim 1, wherein the code symbol sequences are distinguishably generated in data blocks of the size determined according to a characteristic of each stream and an available data rate transmittable on a radio channel.

4. The method of claim 3, wherein if the data blocks are shorter than lengths provided by the data rate, redundancy is added to the data blocks.

5. The method of claim 4, wherein the redundancy-added data blocks are repeated or punctured including the redundancy.

6. An apparatus for simultaneously transmitting data with the same or different priority levels in a mobile communication system, comprising:

a radio link protocol (RLP) portion for classifying transmission data streams by priority level and separating each transmission data stream into data streams of predetermined lengths according to characteristics and a data rate of the data streams;

a multiplexer (MUX) for segmenting the separated data streams according to the data rate;

a plurality of multiple quality control (MQC) channels for encoding the segmented data at a predetermined code rate, repeating code symbol sequences with higher priority levels, and puncturing code symbol sequences with lower priority levels, the number of repeated code symbols being equal to the number of punctured code symbols; and a serial concatenator for serially concatenating the repeated and punctured code symbol sequences, wherein each of the MQC channels comprises:

a channel encoder for encoding the segmented data at the predetermined code rate; and a quality matcher (QM) for repeating the code symbol sequences with the higher priority levels and puncturing the code symbol sequences with the lower priori levels.

7. The apparatus of claim 6, wherein the code symbol sequences are generated in data blocks of lengths determined according to a characteristic of each code symbol sequence and an available data rate on a radio channel.

8. The apparatus of claim 7, further comprising a redundancy selector in each MQC channel, for adding redundancy to the data blocks if the data blocks are shorter than lengths provided by the data rate.

9. The apparatus of claim 7 wherein the channel encoders are turbo encoders.

10. The apparatus of claim 6, further comprising a data rate control unit for determining the data rate based on the data rate information received from a mobile station and then providing the determined data rate with the radio link protocol.

* * * * *